United States Patent
Roth et al.

(10) Patent No.: US 10,113,050 B2
(45) Date of Patent: Oct. 30, 2018

(54) POWDERY OR GRANULATED COMPOSITION COMPRISING A COPOLYMER, A DICARBOXYLIC ACID AND A FATTY MONOCARBOXYLIC ACID

(75) Inventors: Erna Roth, Darmstadt (DE); Ruediger Alexowsky, Nauheim (DE); Hans-Ulrich Petereit, Darmstadt (DE); Christian Meier, Darmstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 847 days.

(21) Appl. No.: 13/322,159

(22) PCT Filed: Jul. 30, 2009

(86) PCT No.: PCT/EP2009/059850
§ 371 (c)(1),
(2), (4) Date: Nov. 23, 2011

(87) PCT Pub. No.: WO2011/012161
PCT Pub. Date: Feb. 3, 2011

(65) Prior Publication Data
US 2012/0071565 A1    Mar. 22, 2012

(51) Int. Cl.
*C08K 5/09* (2006.01)
*C08K 5/092* (2006.01)
*C08L 33/14* (2006.01)

(52) U.S. Cl.
CPC ............... *C08K 5/09* (2013.01); *C08K 5/092* (2013.01)

(58) Field of Classification Search
CPC ............ C08K 5/09; C08K 5/092; C08L 33/14
See application file for complete search history.

(56) References Cited

U.S. PATENT DOCUMENTS

| 5,112,898 A | 5/1992 | Dever et al. |
| 2002/0150624 A1 | 10/2002 | Watanabe et al. |
| 2005/0019381 A1 | 1/2005 | Petereit et al. |
| 2005/0053645 A1 | 3/2005 | Passoni et al. |
| 2005/0112206 A1* | 5/2005 | Watanabe et al. ............ 424/487 |
| 2006/0051412 A1 | 3/2006 | Petereit et al. |

FOREIGN PATENT DOCUMENTS

| CN | 1419445 A | 5/2003 |
| CN | 1443065 A | 9/2003 |
| CN | 1446083 A | 10/2003 |
| CN | 1478481 | 3/2004 |
| EP | 1340496 A1 | 9/2003 |
| KR | 10-2003-0023703 | 3/2003 |
| MX | PA04006256 A | 3/2005 |
| WO | 02 48275 | 6/2002 |
| WO | 03 055471 | 7/2003 |
| WO | 2011 057676 | 5/2011 |

OTHER PUBLICATIONS

Skalsky et al.; "Chapter 9. Chemistry and Application Properties of Polymethacrylate Systems"; in Aqueous Polymeric Coatings for Pharmaceutical Dosage Forms; Third Edition; McGinity et al., Eds.; 2008; Informa Healthcare USA, Inc., New York; pp. 237-277.*
Arechabala et al.; "Comparison of Cytotoxcity of Various Surfactants Tested on Normal Human Fibroblast Cultures using the Neutral Red Test, MTT Assay and LDH Release"; 1999; Journal of Applied Toxicology; 19: 163-165.*
Obeidat et al.; "Novel Combination of Anionic and Cationic Polymethacrylate Polymers for Sustained Release Tablet Preparation"; 2008; Drug Development and Industrial Pharmacy; 34: 650-660.*
Office Action dated Jun. 19,2015 issued in Korean Patent Application No. 10-2012-7002431 with English translation.
Office Action dated May 31, 2016 in European Patent Application No. 09 781 272.1.
Combined Notification of First Office Action and Search Report dated Feb. 4, 2017 in Chinese Patent Application No. 201511018759.3 filed Jul. 30, 2009 with English translation.
International Search Report dated Mar. 17, 2010 in PCT/EP09/059850 Filed Jul. 30, 2009.
U.S. Appl. No. 13/322,159, Filing Date Nov. 23, 2011, Roth, et al.
U.S. Appl. No. 13/378,112, Filing Date Dec. 14, 2011, Roth, et al.
U.S. Appl. No. 13/376,529, Filing Date Dec. 6, 2011, Roth, et al.
Combined Office Action and Search Report dated Aug. 16, 2013 in Chinese Patent Application No. 200980159970.3 (with English-language translation).
U.S. Appl. No. 13/504,527, Filing Date Apr. 27, 2012, Roth, et al.

* cited by examiner

Primary Examiner — Timothy P Thomas
(74) Attorney, Agent, or Firm — Grüneberg and Myers PLLC

(57) ABSTRACT

A powdery or granulated composition, containing: (a) a copolymer containing, in polymerized form, a $C_1$- to $C_4$-alkyl ester of acrylic or methacrylic acid and an alkyl (meth)acrylate monomer containing a tertiary amino group in an alkyl radical; (b) 0.5 to 10% by weight based on (a) of a dicarboxylic acid having 3 to 10 carbon atoms; and (c) 5 to 20% by weight based on (a) of a fatty monocarboxylic acid having 8 to 18 carbon atoms, where the composition contains at least by 30% by weight of (a), (b), and (c).

15 Claims, No Drawings

POWDERY OR GRANULATED COMPOSITION COMPRISING A COPOLYMER, A DICARBOXYLIC ACID AND A FATTY MONOCARBOXYLIC ACID

FIELD OF THE INVENTION

The present invention is concerned with a powdery or granulated composition comprising a copolymer, a dicarboxylic acid and a fatty monocarboxylic acid as ready to use aqueous dispersion for the coating or binding of active ingredients in the field of pharmacy, nutraceuticals or cosmetics.

TECHNICAL BACKGROUND

WO02067906A1 (US20030064036A1) describes a coating and binding agent with improved storage stability, consisting essentially of
  (a) a copolymer, consisting of radically polymerized $C_1$- to $C_4$-alkyl esters of acrylic or methacrylic acid and other alkyl(meth)acrylate monomers which comprise functional tertiary amino groups, the copolymer being in the form of a powder with an average particle size of 1-40 µm,
  (b) 3-15 wt. %, based on (a), of an emulsifier with a HLB value of at least 14,
  (c) 5-50 wt.-%, based on (a), of a C12-C18-monocarboxylic acid or a C12-C18-hydroxyl compound.

One of the beneficial effects of the invention is that the vapour permeability is reduced. Compound (a) is preferably EUDRAGIT® EPO. A preferred compound (b) in the examples is Na-laurylsulfate, which can be used together with lauric acid, stearic acid or lauryl alcohol as compound (c). Dispersion processing times of the inventive examples are around 3 to 6 hours.

PROBLEM AND SOLUTION

There is a permanent need for improved coating and binding agents for pharmaceutically or nutraceutically purposes. Customers prefer ready to use powdery or granulated compositions comprising suitable copolymers which can be used for coating or binding processes after dispersing them in water.

General problems are that additives like emulsifiers must be added to the copolymers to be used for coating or binding processes in order to allow a rapid dispersion times. However additives which allow rapid dispersion times may on the other hand sometimes effect the viscosity of the dispersion in negative way, hinder complete film formation or increase water vapor permeability. Especially if the viscosity of the dispersion is too high this may lead to problems in the subsequently coating or binding process. For improved therapies, drug release from coated dosage forms often is expected to be as fast as possible in water or similar neutral media. Thus a preferred polymer formulation enables water solubility of the coating.

Furthermore some frequently used additives like for instance sodium laurylsulfate (s. WO02067906A1) although in general suitable and accepted for pharmaceutical purposes, are in the meantime regarded as showing a too high level of toxicity. This may depend on the total amount of the polymer and additive composition that is present in a daily dosage of the intended pharmaceutical, nutraceutical or cosmetical form. However in general additives with a toxicity as low as possible are of course preferred.

Thus it is one object of the present invention to provide powdery or granulated compositions for coating or binding purposes that get completely dispersed in water with a processing time as short as possible. The additives employed to support the rapid dispersion time shall show a toxicity level as low as possible. Furthermore the viscosity of the dispersion must be in a range which allows subsequently successful coating or binding procedures and results in complete films being soluble in water.

The problem is solved by a powdery or granulated composition comprising at least by 30% by weight of a mixture of
  (a) a copolymer composed of polymerized units of $C_1$- to $C_4$-alkyl esters of acrylic or methacrylic acid and of alkyl(meth)acrylate monomers with a tertiary amino group in the alkyl radical and
  (b) 0.5 to 10% by weight based on (a) of a dicarboxylic acid having 3 to 10 carbon atoms and
  (c) 5 to 20% by weight based on (a) of a fatty monocarboxylic acid having 8 to 18 carbon atoms.

The inventive composition is intended to be used as rapidly in water dissolving or dispersing powder or granulate. The dispersed aqueous compositions show a low viscosity and can therefore be processed directly as coating and binding agents for pharmaceutically or nutraceutically purposes. Preferred embodiments can be prepared as dispersions with dry weight contents of up to 30% (weight/volume). The main components (a), (b) and (c) preferably show extremely low toxicity data in the range 2000 mg/kg LD50 (rat) or even less toxic.

Component (a)

Component (a) is a copolymer composed of polymerized units of $C_1$- to $C_4$-alkyl esters of acrylic or methacrylic acid and of alkyl(meth)acrylate monomers with a tertiary amino group in the alkyl radical.

Amino Methacrylat Copolymer

The copolymer component (a) may be a so called "amino methacrylate copolymer (USP/NF)", "basic butylated methacrylate copolymer (Ph. Eur)" or "aminoalkyl Methacrylate Copolymer E (JPE)" which are of the EUDRAGIT® E type. Suitable EUDRAGIT® E type copolymers are known, for example, from EP 0 058 765 B1.

The amino (meth)acrylate copolymer may be composed, for example, of 30 to 80% by weight of free-radically polymerized $C_1$- to $C_4$-alkyl esters of acrylic acid or of methacrylic acid, and 70 to 20% by weight of (meth)acrylate monomers having a tertiary amino group in the alkyl radical.

Suitable monomers with functional tertiary amino groups are detailed in U.S. Pat. No. 4,705,695, column 3 line 64 to column 4 line 13. Mention should be made in particular of dimethylaminoethyl acrylate, 2-dimethylaminopropyl acrylate, dimethylaminopropyl methacrylate, dimethylaminobenzyl acrylate, dimethylaminobenzyl methacrylate, (3-dimethylamino-2,2-dimethyl)propyl acrylate, dimethylamino-2,2-dimethyl)propyl methacrylate, (3-diethylamino-2,2-dimethyl)propyl acrylate, diethylamino-2,2-dimethyl) propyl methacrylate and diethylaminoethyl methacrylate. Particular preference is given to dimethylaminoethyl methacrylate.

The content of the monomers with tertiary amino groups in the copolymer may advantageously be between 20 and 70% by weight, preferably between 40 and 60% by weight. The proportion of the $C_1$- to $C_4$-alkyl esters of acrylic acid or methacrylic acid is 70-30% by weight. Mention should be made of methyl methacrylate, ethyl methacrylate, butyl methacrylate, methyl acrylate, ethyl acrylate and butyl acrylate.

A suitable amino (meth)acrylate copolymer may be polymerized of, for example, 20-30% by weight of methyl methacrylate, 20-30% by weight of butyl methacrylate and 60-40% by weight of dimethylaminoethyl methacrylate.

A specifically suitable commercial amino (meth)acrylate copolymer is, for example, formed from 25% by weight of methyl methacrylate, 25% by weight of butyl methacrylate and 50% by weight of dimethylaminoethyl methacrylate (EUDRAGIT® E100 (granulate form) or EUDRAGIT® E PO (powder form)). EUDRAGIT® E100 and EUDRAGIT® E PO are water-soluble below approximately pH 5.0 and are thus also gastric juice-soluble.

Component (b)

Component (b) is a, one or more, dicarboxylic acid having 3 to 10 carbon atoms. Hydroxyl groups and double bonds may be included, however dicarboxylic acids having 4 to 6 carbon atoms are preferred. Suitable amounts are 0.5 to 10, 0.5 to 9 preferred 2 to 8 % by weight based on the copolymer component (a).

In relation to the cationic groups in the polymer component (a) the component (b) may be present in a molar ratio of 0.8 to 30, preferably 5 to 20, most preferred 7 to 17 mol-%.

Dicarboxylic Acids having 3 to 10 Carbon Atoms

Suitable dicarboxylic acids having 3 to 10 carbon atoms are for instance:
- propan-di-acid (HOOC—$CH_2$—COOH)=malonic acid,
- butan-di-acid (HOOC—$C_2H_4$—COOH)=succinic acid,
- fumaric acid (HOOC—$C_2H_2$—COOH),
- malic acid (HOOC—$CH_2$—HCOH—COOH),
- tartaric acid (HOOC—$(HCOH)_2$—COOH),
- pentan-di-acid (HOOC—$C_3H_6$—COOH)=glutaric acid
- hexan-di-acid (HOOC—$C_4H_8$—COOH)=adipinic acid,
- heptan-di-acid (HOOC—$C_5H_{10}$—COOH),
- octan-di-acid (HOOC—$C_6H_{12}$—COOH)=suberic acid,
- nonan-di-acid (HOOC—$C_7H_{14}$—COOH),
- decan-di-acid (HOOC—$C_8H_{16}$—COOH)=sebacinic acid Preferred are dicarboxylic acids having 4 to 10 or 4 to 6 carbon atoms. Most preferred are fumaric acid, malic acid, tartaric acid and succinic acid or mixtures thereof.

Component (c)

Component (c) is a, one or more, fatty monocarboxylic acid having 8 to 18 carbon atoms. Suitable amounts are 5 to 20, preferred 6 to 18% by weight based on the copolymer component (a).

In relation to the cationic groups in the polymer component (a) the component (c) may be present in a molar ratio of 5 to 45, preferably 9 to 37, most preferred 12-33 mol-%.

Fatty Monocarboxylic Acid having 8 to 18 Carbon Atoms

The following monocarbonic acids are preferably suitable for the purposes of the invention:
- $C_8$: caprylic acid ($C_7H_{15}$COOH),
- $C_9$: pelargonic acid ($C_8H_{17}$COOH),
- $C_{10}$: capric acid ($C_9H_{19}$COOH),
- $C_{12}$: lauric acid ($C_{11}H_{23}$COOH),
- $C_{14}$: myristic acid ($C_{13}H_{27}$COOH),
- $C_{16}$: palmitic acid ($C_{15}H_{31}$COOH),
- $C_{18}$: stearic acid ($C_{17}H_{35}$COOH).

Saturated, preferably unbranched, mono carboxylic acid (fatty acid) having 8 to 18, preferably 8 or 10 or 16 or 18 carbon atoms are preferably unsubsituted. Preferred is caprylic acid ($C_7H_{15}$COOH), capric acid ($C_9H_{19}$COOH), lauric acid ($C_{11}H_{23}$COOH), palmitic acid ($C_{15}H_{31}$COOH) or stearic acid ($C_{17}H_{35}$COOH) or mixtures thereof, most preferred in any combination with fumaric acid, malic acid, tartaric acid or sebacinic acid as single components (b) or mixtures thereof.

Pharmaceutical, Nutraceutical or Cosmetical Excipients

The compositions according to the invention are further characterised in that up to 200%, up to 70%, up to 60%, up to 50%, up to 40%, up to 30%, up to 20% or up to 10% by weight based on the total weight of the components (a), (b) and (c) of pharmaceutical, nutraceutical or cosmetical excipients which are different from the components (a), (b) and (c) may be contained. However the composition according to the invention may as well contain any or essentially any pharmaceutical, nutraceutical or cosmetical excipients. Thus the composition may essentially consist or consist to 100% of the components (a), (b) and (c).

The term pharmaceutical, nutraceutical or cosmetical excipients is well known to the skilled person. Many excipients are customary used in pharmacy but also in the field of nutraceuticals or cosmetics, occasionally also they are referred as customary additives. It is, of course, always necessary for all the excipients or customary additives employed to be toxicologically acceptable and usable in particular in food or in medicaments without a risk for customers or patients.

Although the requirements are usually higher in the pharmaceutical field there is a widely overlap of excipients used for pharmaceutical purposes and those used for nutraceutically or cosmetically purposes. Usually all pharmaceutical excipients may be used for nutraceutically or cosmetically purposes and at least a large number of nutraceutical excipients are allowed to be used for pharmaceutical purposes as well. Excipients may be are added to the formulation of the invention, preferably during production of the granules or the mixing of the powders.

Pharmaceutical, nutraceutical or cosmetical excipients with are different from the components (a), (b) and (c) may be contained for practical reasons, for instance to avoid stickiness, increasing the gloss or to add a colour. However these excipients usually do not contribute or do show any or almost no effect on the invention itself as claimed here.

Pharmaceutical, nutraceutical or cosmetical excipients with are different from the components (a), (b) and (c) do not contribute to the invention in a narrow sense which is based on the interaction of the components (a), (b) and (c). Pharmaceutical, nutraceutical or cosmetical excipients with are different from the components (a), (b) and (c) and which may have an essential adverse effect on the major beneficial effects of the present invention e.g. the preparation time or on the viscosity of the dispersion should be avoided and can be excluded. For instance the addition of essential amounts sodium dodecylsulfate or similar substances with emulgator properties different from the components (b) and (c) should be avoided. Preferably any addition of sodium dodecylsulfate or similar substances with emulgator properties different from the components (b) and (c) should be avoided.

Typical pharmaceutical, nutraceutical or cosmetical excipients with are different from the components (a), (b) and (c) are familiar to those skilled in the art. Examples are antioxidants, brighteners, flavouring agents, flow aids, fragrances, glidants (release agents), penetration-promoting agents, pigments, plasticizers, polymers, pore-forming agents or stabilizers. They may be used as processing adjuvants and are intended to ensure a reliable and reproducible preparation process as well as good long-term storage stability, or they achieve additional advantageous properties in the pharmaceutical form. They are added to the polymer formulations before processing and can influence the permeability of the coatings. This property can be used if necessary as an additional control parameter.

Anionic polymers or anionic (meth)acrylate copolymers which could interact with the polymer component (a) may be excluded. Salts of fatty monocarboxylic acid having 10 to 18 carbon atoms and/or a fatty alcohols having 8 to 18 carbon atoms may be excluded as well.

Of course all kind of excipients used must of course be toxicologically safe and to be used in nutraceuticals or pharmaceuticals without risk for customers or patients.

Plasticizers

Plasticizers achieve through physical interaction with a polymer a reduction in the glass transition temperature and promote film formation, depending on the added amount. Suitable substances usually have a molecular weight of between 100 and 20 000 and comprise one or more hydrophilic groups in the molecule, e.g. hydroxyl, ester or amino groups.

Examples of suitable plasticizers are alkyl citrates, glycerol esters, alkyl phthalates, alkyl sebacates, sucrose esters, sorbitan esters, diethyl sebacate, dibutyl sebacate and polyethylene glycols 200 to 12 000. Preferred plasticizers are triethyl citrate (TEC), acetyl triethyl citrate (ATEC), diethyl sebacate and dibutyl sebacate (DBS). Mention should additionally be made of esters which are usually liquid at room temperature, such as citrates, phthalates, sebacates or castor oil. Esters of citric acid and sebacinic acid are preferably used.

Addition of the plasticizers to the formulation can be carried out in a known manner, directly, in aqueous solution or after thermal pre-treatment of the mixture. It is also possible to employ mixtures of plasticizers.

Glidants/Release Agents/Detackifier:

Glidants, release agents or detackifiers usually have lipophilic properties and are usually added to spray suspensions. They prevent agglomeration of cores during film formation. There are preferably used talc, Mg or Ca stearate, ground silica, kaolin or nonionic emulsifiers with an HLB value of between 2 and 8. Standard proportions for use of release agents in the inventive coating and binding agents range between 0.5 and 100 wt % relative to the components (a), (b) and (c).

Pigments:

Only rarely the colours are added in soluble form. As a rule, aluminium oxide or iron oxide pigments are used in dispersed form. Titanium dioxide is used as a whitening pigment. Standard proportions for use of pigments in the inventive coating and binding agents range between 20 and 200 wt % relative to the components (a), (b) and (c).

The Preparation Process

Components (a), (b) and (c) are intermixed with each other in a powdery stage or by a granulations process, which can be a dry, a wet or melt granulation process. As an alternative the components may be added subsequently in the aqueous dispersing phase.

Powder Mixture Process

The components (a), (b) and (c) are intermixed with each other in a powdery stage by using mixer equipment. Powdery stage can be defined in that the particle of components may have an average particle size of less than 2 mm, preferably of less than 1 mm, especially of 100 µm or less, preferably in the range 10 to 100 µm. The average particle size may be determined by sieving techniques or by laser diffraction methods.

Dry Granulation Process

Components (a), (b) and (c) are intermixed with each other in a form of granulates by using a mixer equipment. Granulates may have an average particle size of 1 mm or more, preferably in the range of 1 to 5 mm.

Wet Granulation Process

Powders or granules of components (a), (b) and (c) are intermixed with each other in a wet stage by wetting the powders or granulates with water or organic solvents and then using a mixer or kneading equipment. Wet stage shall mean that there is a wet mass than can be manually kneaded with a water content for instance in the range 10 to 100% by weight. After wetting and mixing respectively kneading the wet mass is dried and then again commuted to granules or powders. The process of wet granulation is well known to a skilled person. Solutions of the components (a), (b) or (c) or combinations thereof in organic solvents like methanol, ethanol, isopropanol, ethyl acetate or acetone may also be used in the wet granulation process. The organic solvents may optionally contain up to 50% (v/v) of water.

Melt Granulation Process

Powders or granules of components (a), (b) and (c) are intermixed with each other usually without the addition of solvents at elevated temperatures where at least the copolymer is in a molten stage. Suitable temperatures are for instance in the range of 80 to 200° C. This can be performed in a heated mixer or in an extruder, preferably in a twin screw extruder with preferably counter rotating barrels. After mixing the molten mass is cooled and then again commuted to granules or to powders. The process of melt granulation is well known to a skilled person.

Dispersion or Solution Process

The components (a), (b) and (c) are added to the aqueous dispersing or solution agent, preferably purified water, as powder mixtures, granules or single one after another while gentle stirring with a conventional stirrer at room temperature. Advantageously, according to this invention, the need of a high shear mixer or specific disperser will not be necessary. Additionally, the heating of the suspension will be not necessary. After stirring of less than 3 hours, dispersions or solutions are formed being able to be sprayed in coating or granulation processes and/or to form films after drying. The dispersion or solution may have a total content of solids less than 35%, preferably less than 25% and pH-values between 5 and 9. The pH values of a dispersion or solution may in the range from 5 to 9, preferably from 6 to 8.

Dispersion or Solution Preparation Time

The dispersion or solution preparation time can for instance be observed and determined by polarization microscopy. The time when the powdery or granulate mixture is added into the water is defined as starting point. The dispersing aqueous mixture is then further stirred at room temperature (ca. 22° C.). At the beginning there is a turbid dispersion, that becomes first white and then more and more clear during stirring. Drops of the dispersing aqueous mixture are then taken every 10 minutes and observed under a polarization microscope with a magnification of 100-fold with the support of a phase filter. The time point when no or almost no particles (at least less than ten particles in the view field) are observed in the fluid of such a drop under the microscope is taken as end point of the dispersion process. At this time point a clear dispersion or solution respectively is produced. The accuracy of this determination method is in most cases sufficient to differ the preparation times of the different dispersion preparations apart from each other. The inventive composition may be characterized by a dispersion or solution preparation time of less than 3 hours, preferably 2.5 hours or less most preferred 1.5 hours or less. The preparation time is starting from adding the dry powdery or granulate mixture into water at room temperature, further stirring and thereby dissolving the components to end up at a clear solution or dispersion respectively.

Practical Applications:

Dispersions according to this invention may be used in granulation or coating process in the development and manufacturing of nutrition supplements, nutraceuticals, cosmetics, cosmeceuticals, pharmaceutical intermediates or pharmaceuticals. Due to the physicochemical properties of the polymer, which are maintained in the dispersed compounds of this invention, functions such as coloring, taste masking, moisture protection, light protection, odor masking or eased swelling are introduced into the final dosage form.

Application procedures and processes known to the skilled person and published for example in:

G. Cole, J. Hogan, M. Aulton, Pharmceutical coating Technology Taylor & Francis, 1995

K. H. Bauer, K. Lehmann, H. P. Osterwald, G. Rothgang, "Coated Dosage Forms", CRC Press 1998

Pharmaceutical Manufacturing Encyclopedia, William Andrew Publishing; Third Edition, 2005

Encyclopedia of Pharmaceutical Technology, Third Edition,. Informa Healthcare, 2006

J. W. McGinity, L. A. Felton, aqueous Polymeric Coatings for Pharmaceutical Dosage Forms, Third Edition, Informa Healthcare, 2008

Nutraceuticals

Nutraceuticals can be defined as extracts of foods claimed to have medical effects on human health. The nutraceutical is usual contained in a medical format such as capsule, tablet or powder in a prescribed dose. Examples for nutraceuticals are resveratrol from grape products as an antioxidant, soluble dietary fiber products, such as psyllium seed husk for reducing hypercholesterolemia, broccoli (sulphane) as a cancer preservative, and soy or clover (isoflavonoids) to improve arterial health. Other nutraceuticals examples are flavonoids, antioxidants, alpha-linoleic acid from flax seed, beta-carotene from marigold petals or antocyanins from berries. Sometimes the expression neutraceuticals is used as synonym for nutraceuticals.

Cosmetics

Cosmetics are substances used to enhance or protect the appearance or odor of the human body. Typical cosmetical active ingredients may comprise vitamins, phytochemicals, enzymes, antioxidants, and essential oils. Cosmetics may include skin-care creams, lotions, powders, perfumes, lipsticks, fingernail and toe nail polish, eye and facial makeup, permanent waves, colored contact lenses, hair colors, hair sprays and gels, deodorants, baby products, bath oils, bubble baths, bath salts, butters and many other types of products. Their use is widespread, especially among women but also by men. A subset of cosmetics is called "make-up," which refers primarily to colored products intended to alter the user's appearance. Many manufacturers distinguish between decorative cosmetics and care cosmetics. The term cosmetics shall include topically applied forms such as so called cosmeceuticals as well as orally ingested forms such as so called nutricosmetics.

Active ingredients

The inventive composition may be used as a coating and binding agent in combination with all kinds of pharmaceutical, nutraceutical or cosmeceutical active ingredients. However additionally beneficial effects may be gained in combination with those kinds of active ingredients, which need to be formulated in a taste masked form or in a moisture resistant form.

Pharmaceutically, nutraceutically or cosmetically active ingredients have in common that they are active ingredients which have a positive effect on the health of an organism, e.g the human health. They have also in common that their formulations are often the same or very similar. Often also the same kinds of excipients or additives are used in combination with these kind of active ingredients. Pharmaceutically active ingredients are used to cure diseases and effect the health of an organism, e.g the human health more or less directly. Nutraceutical active ingredients are used to supplement the nutrition and thus support the health of an organism, e.g the human or animal health indirectly. Cosmetically active ingredients are meant to support the human health indirectly for instance by balancing the water content of the human skin.

Process

The invention also relates to a process for preparing the inventive composition, characterized in that the components (a), (b) and (c) are intermixed with each other by powder mixture, dry granulation, wet granulation or melt granulation. In the case of wet granulation and the components (a), (b) and (c) may be used in the form of an organic solution.

Use

The invention discloses the use of the composition as a coating or binding agent for the spray coating or binding of pharmaceutical, nutraceutical or cosmetical compositions. Preferred active ingredient containing compositions may be in the form of pellets, granules, minitablets, tablets or capsules or nutraceutical compositions or cosmetical compositions. The use as a coating solution shall include the use as a subcoat or a topcoat in combination with other coatings.

EXAMPLES

The following copolymers were used in the Examples.
Copolymer:
BASIC BUTYLATED METHACRYLATED COPOLYMER EUDRAGIT® E PO or EUDRAGIT® E 100.

EUDRAGIT® E is a copolymer composed of 25% by weight of methyl methacrylate, 25% by weight of butyl methacrylate and 50% by weight of dimethylaminoethyl methacrylate.

Model Drug

Studies were conducted using tablets (300 mg) with quinidine sulphate (immediate bitter taste) or silicagel (550 mg total weight, 11 mm diameter) as marker.

Excipients

All excipients were used in pharmaceutical quality

Disintegration Studies:

Disintegration was tested according USP 28 <701> Disintegration

Dissolution Studies

Coated tablets were tested according to

USP 28-NF23, General Chapter <711>, *Dissolution,*

Dissolution parameters:
Apparatus: USP Type-II (Paddle)
RPM: 50/min.
Temperature: 37.5±0.5° C.
Dissolution volume: 900 ml.
Wavelength: 250 nm Dissolution Medium 1:
0.1 molar Hydrochloric acid (HCl), (European Pharmacopoeia=EP)

Dissolution Medium 2:
Phosphate buffer pH 6.0 (European Pharmacopoeia=EP)

The following tables explain the formulation examples 1-35 according to the invention as well as non inventive comparative examples: Dispersion are prepared by adding the component (b), (a) and c) in this order separately, or a premixture of all components in purified water in a quantity, providing the specified dry solid content. Stirring was performed with a magnetic stirrer or a simple agitator providing low shear forces.

In examples 33, 34 and 35 organic solvents are used for granulation. EUDRAGIT® E 100 was dissolved in isopropanol (95% w/w) to form a 15% (w/w) solution while gentle stirring. The components (b) and (c) were added subsequently and stirred until complete dissolution. In case a glidant was used too, it was added to the clear solution and shortly stirred to get a homogeneous suspension. The final suspension was dried completely in a vacuum oven at 50° C. for 24 h. The dried film was milled to get a powder of ca 0.5 mm particle diameter. The powder was tested accordingly to examples 1 to 32.

TABLE 1

| Components | Example | C1 | 2 | 3 | 4 | C5 | 6 |
|---|---|---|---|---|---|---|---|
| Component (a) | EUDRAGIT ® E PO | 100 | 100 | 100 | 100 | 100 | 100 |
| Component (b) calculated on (a) weight [%] (mol [%]) | malic acid | 3.3 (7.7) | 3.3 (7.7) | 3 (7.0) | 0.43 (1.0) | 3 (7.0) | 0.833 (1.9) |
| Component (c) calculated on (a) weight [%] (mol [%]) | stearic acid | 22.8 (25.0) | | | | | |
| | caprylic acid | | 11.6 (25.1) | 9.2 (19.9) | 16.2 (35.0) | 4.6 (9.9) | 16.7 (36.1) |
| Content [%] | (a + b + c) | 100 | 100 | 100 | 100 | 100 | 100 |
| Preparation time [h] | | 2.5 | 0.5 | 1.5 | 1.5 | >24 | 1.5 |
| Dry content in dispersion weight [%] | 15 | x | x | x | x | x | x |
| Viscosity low = x; middle = xx; high = xxx | | xxx | x | x | x | | xx |
| Film taste | | | neutral | neutral | neutral | | neutral |
| Observation | | clear gel, to high viscous for coatings | clear sulution | clear sulution | white dispersion | no preparation to low on (c) | white dispersion |

(mol [%]) = (mol [%]) of components (b) or (c) in relation to the cationic groups in the polymer component (a).

TABLE 2

| Components | Example | C7 | 8 | 9 | 10 | 11 | C12 |
|---|---|---|---|---|---|---|---|
| Component (a) | EUDRAGIT ® E PO | 100 | 100 | 100 | 100 | 100 | 100 |
| Component (b) calculated on (a) weight [%] (mol [%]) | malic acid | 0.43 (1.00) | 2.2 (5.1) | 6.5 (15.1) | | 6.5 (15.1) | 8.6 (20.0) |
| | sebacinic acid | | | | 9.8 (15.1) | | |
| Component (c) calculated on (a) weight [%] (mol [%]) | caprylic acid | 18.5 (40.0) | 16.2 (35.0) | 16.2 (35.0) | 16.2 (35.0) | 6.5 (14.1) | 6.5 (14.1) |
| content [%] | (a + b + c) | 100 | 100 | 100 | 100 | 100 | 100 |
| preparation time [h] | | 20 | 0.75 | 0.2 | 0.5 | 0.8 | 0.5 |
| Dry content in dispersion weight [%] | 15 | x | x | x | x | x | x |
| Viscosity low = x; middle = xx; high =xxx | | x | x | x | | x | x |
| Film taste | | | neutral | neutral | neutral | neutral | bitter |
| Observation | | white dispersion | clear sulution | clear sulution | clear sulution | clear sulution | clear sulution |

(mol [%]) = (mol [%]) of components (b) or (c) in relation to the cationic groups in the polymer component (a).

TABLE 3

| Components | Example | C13 | C14 | C15 | C16 | C17 | 18 |
|---|---|---|---|---|---|---|---|
| Component (a) | EUDRAGIT ® E PO | 100 | 100 | 100 | 100 | 100 | 100 |
| Component (b) calculated on (a) weight [%] (mol [%]) | malic acid | 2.6 (6.0) | 6.5 (15.1) | 2.2 (5.1) | | | 3 (7.0) |
| Non-inventive tri carboxylic acid calculated on a.) weight [%] (mol [%]) | citric acid | | | | | 4.8 (7.8) | |
| Component (c) calculated on (a) weight [%] (mol [%]) | stearic acid | | | 31.9 (35.0) | | 15 (16.4) | |
| | palmitic acid | | 28.8 (35.0) | | | | 15 (18.2) |
| | caprylic acid | 6.5 (14.1) | | | 6.92 (15.0) | | |
| content [%] | (a + b + c) | 100 | 100 | 100 | 100 | 100 | 100 |

TABLE 3-continued

| Components | Example | C13 | C14 | C15 | C16 | C17 | 18 |
|---|---|---|---|---|---|---|---|
| preparation time [h] | | 16 | 18 | 18 | >24 | — | 1.5 |
| Dry content in dispersion weight [%] | 15 | x | x | x | x | x | x |
| Viscosity low = x; middle = xx; high = xxx | | x | xxx | xxx | | | x |
| Film taste | | neutral | neutral | | | | neutral |
| Observation | | clear solution | clear gel with palmitic acid undissolved | clear gel with stearic acid undissolved | no preparation | no preparation | clear sulution |

(mol [%]) = (mol [%]) of components (b) or (c) in relation to the cationic groups in the polymer component (a).

TABLE 4

| Components | Example | 19 | 20 | 21 | 22 | 23 | 24 | 25 | 26 |
|---|---|---|---|---|---|---|---|---|---|
| Component (a) | EUDRAGIT ® E PO | 100 | 100 | 100 | 100 | 100 | 100 | 100 | 100 |
| Component (b) calculated on (a) weight [%] (mol [%]) | fumaric acid | | | | | 2.6 (7.0) | 2.6 (7.0) | 2.6 (7.0) | 1.9 (5.1) |
| | malic acid | | 3 (7.0) | | | | | | |
| | tartaric acid | 3.33 (6.9) | | | | | | | |
| | sebacinic acid | | | 15 (23.1) | 10 (15.4) | | | | |
| Component (c) calculated on (a) weight [%] (mol [%]) | stearic acid | 15 (16.4) | 15 (16.4) | | | | 15 (16.4) | | |
| | lauric acid | | | | 10 (15.6) | | | | |
| | capric acid | | | | | | | 19.3 (34.9) | |
| | caprylic acid | | | | | 16.2 (35.0) | | | 16.2 (35.0) |
| content [%] | (a + b + c) | 100 | 100 | 100 | 100 | 100 | 100 | 100 | 100 |
| preparation time [h] | | 1.8 | 1.5 | 2 | 1.5 | 0.7 | 2.8 | 0.8 | 0.8 |
| Dry content in dispersion weight [%] | 15 18 | x | x x | x | x | x | x | x | x |
| Viscosity low = x; middle = xx; high = xxx | | x | xx | x | x | xx | x | x | x |
| Film taste | | neutral | neutral | neutral | neutral | neutral | neutral | neutral | neutral |
| Observation | | clear sulution | clear sulution | clear sulution | clear sulution | clear sulution | clear sulution | clear sulution | clear sulution |

(mol [%]) = (mol [%]) of components (b) or (c) in relation to the cationic groups in the polymer component (a).

TABLE 5

| Components | Example | 27 | C28 | C29 | 30 | C31 |
|---|---|---|---|---|---|---|
| Component (a) | EUDRAGIT ® E PO | 100 | 100 | 100 | 100 | 100 |
| Component (b) calculated on (a) weight [%] (mol [%]) | malic acid | 7 (16.3) | 7 (16.3) | 4 (9.3) | | |
| | sebacinic acid | | | | 10 (15.4) | 10 (15.4) |
| Component (c) calculated on (a) weight [%] (mol [%]) | stearic acid | | | | | 4.5 (4.9) |
| | caprylic acid | 5.5 (11.9) | 22 (47.6) | 25 (54.0) | 5.5 (11.9) | |
| Content [%] | (a + b + c) | 100 | 100 | 100 | 100 | 100 |
| Preparation time [h] | | 0.5 | 0.5 | 0.25 | 1 | 3.5 |
| Dry content in dispersion weight [%] | 15 | x | x | x | x | x |
| Viscosity low = x; middle = xx; high =xxx | | x | x | x | x | x |
| Film taste | | neutral | unpleasant, bitter | unpleasant, bitter | neutral | neutral |
| Observation | | solution | solution | solution | solution | solution |

(mol [%]) = (mol [%]) of components (b) or (c) in relation to the cationic groups in the polymer component (a).

TABLE 6

| Components | Example | 32* | 33 | 34 | 35 |
|---|---|---|---|---|---|
| Component (a) | EUDRAGIT ® E PO | 100 | 100 | 100 | 100 |
| Component b.) calculated on (a) weight [%] (mol [%]) | malic acid | 2.6 (6.0) | 2.8 (6.5) | 2.8 (6.5) | 2.8 (6.5) |
| Component (c) calculated on (a) weight [%] (mol [%]) | stearic acid | 15 (16.44) | — | — | — |
| | caprylic acid | | 15.0 (32.4) | 15.0 (32.4) | 15.0 (32.4) |
| content [%] | (a + b + c) | 100 | 100 | 77.1 | 77.1 |
| Other exipients calculated on a.) weight [%] | Magnesium stearate Syloid 244 FP | | — | –35.0 — | — 35.0 |
| preparation time [h] | | 1.5 | 0.5 | 2.8 | 1.0 |
| Dry content in dispersion weight [%] | | 15 | 20 | 20 | 20 |
| Viscosity low = x; middle = xx; high = xxx | | x | x | x | x |
| Film taste | | neutral | neutral | neutral | neutral |
| Observation | | from extrusion-string: solution | clear solution | Dispersion | |

*Example for extruded composition (mol [%]) = (mol [%]) of components (b) or (c) in relation to the cationic groups in the polymer component (a).

Example 20 A

Coating Suspension Preparation:

A coating composition was prepared mixing the formulation of example 20 with talc (50% w/w ref. to polymer) and dispersing the powder compound in purified water by gentle stirring. The coating suspension had a content of dry solid of 18% w/w. Stirring is continued through the entire coating process.

Coating Process:

1800 g Quinidine sulphate tablets were loaded in a side vented coating pan Hi Coater LHC 30, Loedige) and coated with the coating suspension under appropriate conditions, i.e. a spray rate of approximately 5 g/min coating suspension per kg cores and a bed temperature of approximately 28-33° C. Dry polymer weight gain was adjusted to 2 mg/cm² tablet surface. After coating the tablets were dried in the coater for 5 min at 40° C. and for 2 hours on trays on an oven at 40° C.

Results:

All coated tablets provided neutral taste over more than 10 minutes.

Example 20 B

Example 20B was carried out according to example 20A but with dry polymer weight gain 4 mg/cm² tablet surface.

Results:

All coated tablets provided neutral taste over more than 10 minutes. Table 7: All coated tablets released more than 90% of the quinidine sulfate in purified water in 15 min. This was significantly faster than the tablets according to comparative example 20D.

TABLE 7

| Purified water time [min] | Example 20B 4 mg/cm² on Polymer | Comparative example 20D 4 mg/cm² on Polymer |
|---|---|---|
| 0 | 0.0 | 0.0 |
| 5 | 0.6 | 0.0 |
| 10 | 62.8 | 5.7 |
| 15 | 93.0 | 18.0 |

TABLE 7-continued

| Purified water time [min] | Example 20B 4 mg/cm² on Polymer | Comparative example 20D 4 mg/cm² on Polymer |
|---|---|---|
| 20 | 98.0 | 44.7 |
| 25 | 98.9 | 61.7 |
| 30 | 99.2 | 70.7 |
| 35 | 99.3 | 84.3 |
| 40 | 99.5 | 89.1 |
| 45 | 99.6 | 90.9 |
| 50 | 99.7 | 92.0 |
| 60 | 99.9 | 93.7 |
| 63 homogenized | 100.0 | 100.0 |

Example 20 C

Example 20C was carried out according to example 20A but with dry polymer weight gain 10 mg/cm² tablet surface.

Results:

All coated tablets provided neutral taste over more than 10 minutes. Table 8: All coated tablets released more than 90% of the quinidine sulfate in dissolution medium 1 (0.1 N HCl, pH 1.2) in 10 min. The result for example 20C was alsmost identical to the comparative example 20D.

Table 9: All coated tablets released more than 90% of the quinidine sulfate in dissolution medium 2 (buffer pH 6.0) in 15 min. After 10 min the tablets of example 20C released more than 80% compared less than 50% in the

TABLE 8

| Dissolution medium 1 0.1M HCl time [min] | Example 20C 10 mg/cm² on Polymer | Comparative example 20D 10 mg/cm² on Polymer |
|---|---|---|
| 0 | 0.0 | 0.0 |
| 10 | 95.0 | 95.6 |
| 15 | 96.8 | 97.0 |
| 20 | 97.7 | 97.8 |
| 25 | 98.2 | 98.2 |
| 30 | 98.5 | 98.5 |

TABLE 8-continued

| Dissolution medium 1 0.1M HCl time [min] | Example 20C 10 mg/cm² on Polymer | Comparative example 20D 10 mg/cm² on Polymer |
|---|---|---|
| 45 | 99.3 | 99.0 |
| 60 | 99.5 | 99.4 |
| 63 homogenized | 100.0 | 100.0 |

TABLE 9

| Dissolution medium 2 (Buffer pH 6.0 EP) time [min] | Example 20C 10 mg/cm² on Polymer | Comparative example 20D 10 mg/cm² on Polymer |
|---|---|---|
| 0 | 0.0 | 0.0 |
| 5 | 0.4 | 0.1 |
| 10 | 85.8 | 44.2 |
| 15 | 98.7 | 93.7 |
| 20 | 99.3 | 97.3 |
| 25 | 99.5 | 98.2 |
| 30 | 99.6 | 98.6 |
| 35 | 99.7 | 98.9 |
| 40 | 99.8 | 99.3 |
| 45 | 99.9 | 99.5 |
| 50 | 99.9 | 99.7 |
| 63 homogenized | 100.0 | 99.9 |

Comparative Example 20 D

Example 20D was carried out according to EP1368007 B1. The formulation contained EUDRAGIT® EPO, 10% sodium lauryl sulfate, 15% by weight of stearic acid and 50% of talc (% by weight means based on polymer).
Coating Suspension Preparation:
A coating composition was prepared from the components of example 20D by dispersing the compounds in purified water. The coating suspension had a content of dry solid of 18% w/w. Stirring is continued through the entire coating process.
Coating Process:
1800 g Quinidine sulphate tablets were loaded in a side vented coating pan Hi Coater LHC 30, Loedige) and coated with the coating suspension under appropriate conditions, i.e. a spray rate of approximately 5 g/min coating suspension per kg cores and a bed temperature of approximately 28-33° C. Dry polymer weight gain was adjusted to 4 mg/cm² or 10 mg/cm² tablet surface respectively. After coating the tablets were dried in the coater for 5 min at 40° C. and for 2 hours on trays on an oven at 40° C.

Example 20 E

Coating Suspension Preparation:
A coating composition was prepared mixing the formulation of example 20 with talc (50% w/w ref. to polymer) and dispersing the powder compound in purified water by gentle stirring. The coating suspension had a content of dry solid of 18% w/w. Stirring is continued through the entire coating process.
Coating Process:
1800 g Silicagel tablets sulphate tablets were loaded in a side vented coating pan Hi Coater LHC 30, Loedige) and coated with the coating suspension under appropriate conditions, i.e. a spray rate of approximately 5 g/min coating suspension per kg cores and a bed temperature of approximately 38-33° C. Dry polymer weight gain was adjusted to 4 mg/cm² tablet surface. After coating the tablets were dried in the coater for 5 min at 40° C. and for 2 hours on trays on an oven at 40° C.
Results:
Coated and uncoated tablets were stored in open containers at 40° C. and 75% rel. humidity. After 8 hours of testing the moistures uptake of the coated tablets was less than 45% compared to the uncoated tablets being set by 100%

Example 20 F

Coating Suspension Preparation:
A coating composition was prepared mixing the formulation of example 20 with talc (50 % w/w ref. to polymer) and dispersing the powder compound in purified water by gentle stirring. The coating suspension had a content of dry solid of 18% w/w. Stirring is continued through the entire coating process.
Coating Process:
1800 g Silicagel tablets sulphate tablets were loaded in a side vented coating pan Hi Coater LHC 30, Loedige) and coated with the coating suspension under appropriate conditions, i.e. a spray rate of approximately 5 g/min coating suspension per kg cores and a bed temperature of approximately 28-33° C. Dray polymer weight gain was adjusted to 10 mg/cm² tablet surface. After coating the tablets were dried in the coater for 5 min at 40° C. and for 2 hours on trays on an oven at 40° C.
Results: Coated and uncoated tablets were stored in open containers at 40° C. and 75% rel. humidity. After 8 hours of testing the moistures uptake of the coated tablets was less than 15% compared to the uncoated tablets, being set by 100%

The invention claimed is:

1. A powdery or granulated composition, comprising at least 30% by weight of a mixture comprising:
   (a) a copolymer comprising, in polymerized form, a $C_1$- to $C_4$-alkyl ester of acrylic or methacrylic acid and an alkyl(meth)acrylate monomer comprising a tertiary amino group in an alkyl radical;
   (b) 0.5 to 10% by weight based on (a) of a dicarboxylic acid comprising 4 to 10 carbon atoms; and
   (c) 5 to 20% by weight based on (a) of a linear, saturated fatty monocarboxylic acid comprising 8 to 18 carbon atoms;
   wherein
   a molar ratio of the dicarboxylic acid to the tertiary amino groups of copolymer (a) is from 0.8/100 to 17/100,
   a molar ratio of the fatty monocarboxylic acid to the tertiary amino groups of copolymer (a) is from 5/100 to 45/100, and
   a dispersion or solution preparation time of the composition is less than 3 hours.

2. The composition of claim 1, wherein the copolymer (a) comprises in polymerized form, 30 to 80% by weight of the $C_1$- to $C_4$-alkyl ester of acrylic or methacrylic acid and 70 to 20% by weight of the alkyl(meth)acrylate monomer comprising a tertiary amino group in the alkyl radical.

3. The composition of claim 1, wherein the copolymer (a) comprises in polymerized form, 20 - 30% by weight of methyl methacrylate, 20 - 30% by weight of butyl methacrylate and 60 - 40% by weight of dimethylaminoethyl methacrylate.

4. The composition of claim 1, wherein the dicarboxylic acid (b) is at least one selected from the group consisting of fumaric acid, malic acid, tartaric acid, and succinic acid.

5. The composition of claim 1, wherein the fatty monocarboxylic acid (c) is at least one selected from the group consisting of caprylic acid, capric acid, lauric acid, palmitic acid, and stearic acid.

6. The composition of claim 1, further comprising up to 200% by weight based on a total weight of (a), (b), and (c) of a pharmaceutical, a nutraceutical, or a cosmetical excipient which are different from (a), (b), and (c).

7. The composition of claim 6, wherein the pharmaceutical, nutraceutical, or cosmetical excipient is at least one selected from the group consisting of an antioxidant, a brightener, a flavouring agent, a flow aid, a fragrance, a glidant (release agent), a penetration-promoting agent, a pigment, a plasticizer, a pore-forming agent, and a stabilizer.

8. The composition of claim 1, wherein the composition is comprised in an aqueous dispersion,
wherein the aqueous dispersion is in a dispersed or dissolved form and has a dry weight content of 5 to 40% (weight/volume).

9. An aqueous dispersion or solution comprising the composition of claim 1, obtained by a process comprising:
combining a dry powdery or granular mixture of (a), (b), and (c) with water;
stirring the dry powdery or granulate mixture into water at room temperature; and
further stirring and thereby dissolving the dry powdery or granulate mixture, to obtain a clear aqueous dispersion or solution, respectively,
wherein the aqueous dispersion or solution is obtained in less than 3 hours from beginning the stirring.

10. A process for preparing a composition of claim 1, the process comprising:
combining (a), (b), and (c), wherein the combining is carried out by powder mixing, dry granulation, wet granulation, or melt granulation.

11. The process of claim 10, wherein the combining is carried out by wet granulation, and wherein (a), (b), and (c) are in the form of an organic solution.

12. A process for coating a pharmaceutical, nutraceutical, or cosmetical composition, the process comprising:
contacting a composition of claim 1 with a pharmaceutical, nutraceutical, or cosmetical composition.

13. A process for binding a pharmaceutical, nutraceutical, or cosmetical composition, the process comprising:
contacting a binding agent comprising a composition of claim 1 with a pharmaceutical, nutraceutical, or cosmetical composition.

14. The powdery or granulated composition according to claim 1, wherein the preparation time is the time point when substantially no particles are observed in a fluid under a polarization microscope with a magnification of 100-fold with the support of a phase filter when a less than 35% by weight of the composition is stirred in water at room temperature.

15. The powdery or granulated composition according to claim 2, wherein the preparation time is the time point when substantially no particles are observed in a fluid under a polarization microscope with a magnification of 100-fold with the support of a phase filter when a less than 35% by weight of the composition is stirred in water at room temperature.

* * * * *